US010901457B2

(12) United States Patent
Ou et al.

(10) Patent No.: US 10,901,457 B2
(45) Date of Patent: Jan. 26, 2021

(54) DISPLAY DEVICE INCLUDING A HINGE MECHANISM WITH GEAR-LINK AND SLIDER

(71) Applicant: GOOGLE LLC, Mountain View, CA (US)

(72) Inventors: Davis Ou, New Taipei (TW); Han-Wen Yeh, New Taipei (TW); Mike Liu, New Taipei (TW); Wen Shian Lin, New Taipei (TW); Chihung Lin, New Taipei (TW)

(73) Assignee: GOOGLE LLC, Mountain View, CA (US)

( * ) Notice: Subject to any disclaimer, the term of this patent is extended or adjusted under 35 U.S.C. 154(b) by 145 days.

(21) Appl. No.: 16/160,768

(22) Filed: Oct. 15, 2018

(65) Prior Publication Data
US 2020/0117233 A1 Apr. 16, 2020

(51) Int. Cl.
*G06F 1/16* (2006.01)
*E05D 7/00* (2006.01)
*H04B 1/3827* (2015.01)

(52) U.S. Cl.
CPC ............ *G06F 1/1616* (2013.01); *E05D 7/00* (2013.01); *H04B 1/3827* (2013.01); *E05Y 2900/606* (2013.01)

(58) Field of Classification Search
CPC ....... G06F 1/1616; G06F 1/1652; E05D 7/00; H04B 1/3827; E05Y 2900/606; H04M 1/0268; H04M 1/0216
See application file for complete search history.

(56) References Cited

U.S. PATENT DOCUMENTS 8,713,757 B2 5/2014 Chen et al.
9,064,431 B2 6/2015 Ahn et al.
(Continued)

FOREIGN PATENT DOCUMENTS

CN 106255935 A 12/2016
CN 103034293 B 7/2018
(Continued)

OTHER PUBLICATIONS

English translation of Office Action for Taiwanese Application No. 108133746, dated Mar. 25, 2020, 3 pages.
(Continued)

*Primary Examiner* — Rockshana D Chowdhury
(74) *Attorney, Agent, or Firm* — Brake Hughes Bellermann LLP

(57) ABSTRACT

In a general aspect, a foldable display device may include a processor, a memory, a first housing having a first end portion and a second end portion, a first length extending between the first end portion and the second end portion of the first housing, a second housing having a first end portion and a second end portion, a second length extending between the first end portion and the second end portion of the second housing, the second length being different than the first length, a flexible display coupled to the first housing and the second housing, and a hinge assembly coupled to the first housing and the second housing for relative rotation of the first housing and the second housing. The hinge assembly may include a slider, a lever attached to the slider, a set of gears disposed on the slider, and a linkage member connecting the lever and the set of gears together. Upon the relative rotation occurring in a first direction by the second housing, the set of gears rotates and causes the lever to move translationally move the first housing in a first linear direction, and upon the relative rotation occurring in a second
(Continued)

direction by the second housing, the set of gears rotates and causes the lever to move translationally move in a second linear direction, the second linear direction being opposite to the first linear direction.

20 Claims, 15 Drawing Sheets

(56) References Cited

U.S. PATENT DOCUMENTS

| | | | | |
|---|---|---|---|---|
| 9,348,450 B1* | 5/2016 | Kim | .................... | G06F 3/0412 |
| 9,557,771 B2* | 1/2017 | Park | .................... | G06F 1/1641 |
| 9,756,757 B2* | 9/2017 | Park | .................... | H05K 5/0017 |
| 9,791,892 B2 | 10/2017 | Park et al. | | |
| 10,317,934 B2* | 6/2019 | Hampton | .............. | G06F 1/1616 |
| 10,423,019 B1* | 9/2019 | Song | .................. | H04M 1/0268 |
| 10,664,021 B1* | 5/2020 | Hsu | ......................... | H04M 1/02 |
| 2015/0233162 A1* | 8/2015 | Lee | ....................... | G06F 1/1626 |
| | | | | 16/223 |
| 2015/0361696 A1* | 12/2015 | Tazbaz | ................. | G06F 1/1681 |
| | | | | 361/679.27 |
| 2018/0011515 A1 | 1/2018 | Yoo et al. | | |
| 2018/0150107 A1* | 5/2018 | Lee | ....................... | G06F 1/1681 |

FOREIGN PATENT DOCUMENTS

| | | |
|---|---|---|
| EP | 3109847 A1 | 12/2016 |
| TW | 281738 B | 7/1996 |

OTHER PUBLICATIONS

International Search Report and Written Opinion for Application No. PCT/US2019/055405, dated Mar. 19, 2020, 10 pages.

* cited by examiner

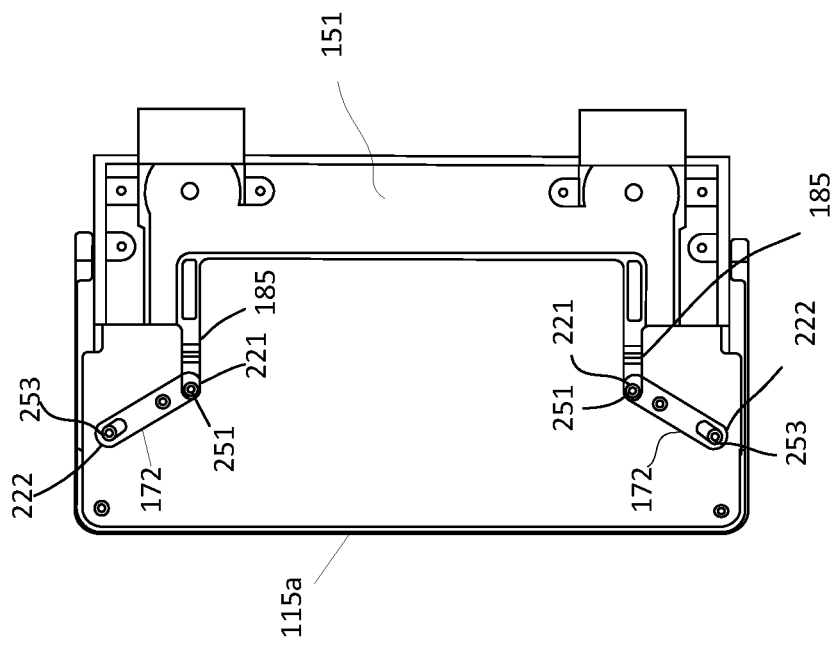
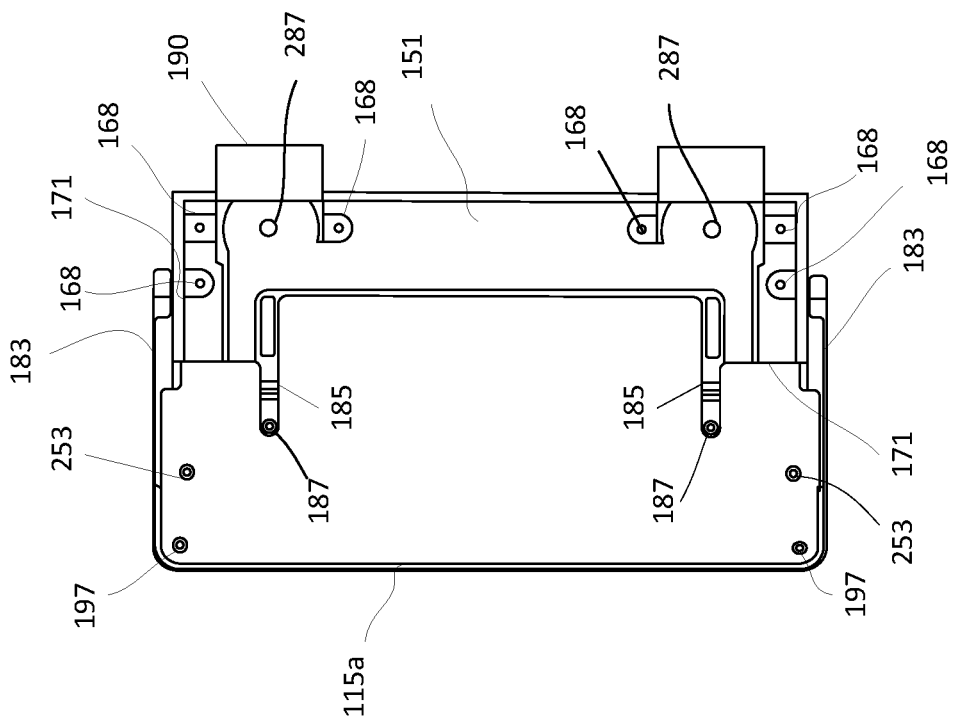
FIG. 5B
FIG. 5A

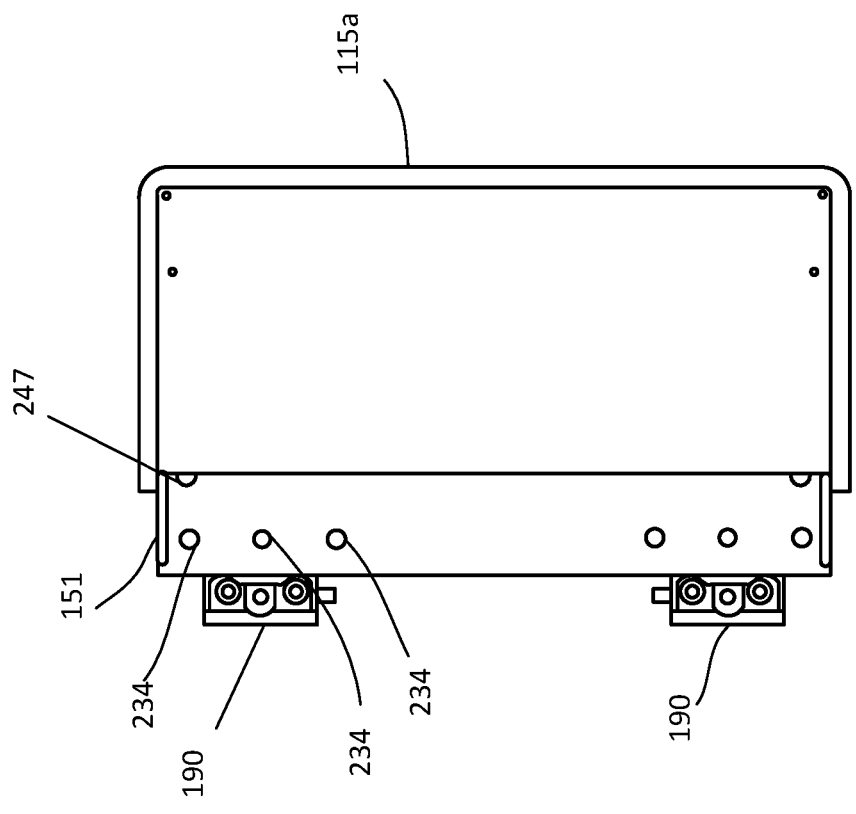
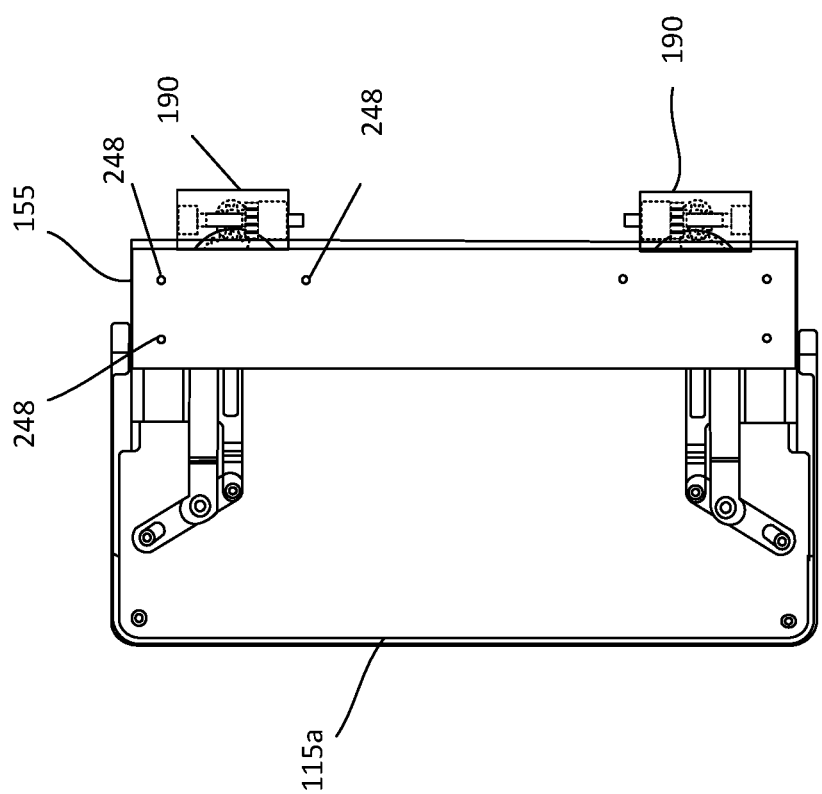

DISPLAY DEVICE INCLUDING A HINGE MECHANISM WITH GEAR-LINK AND SLIDER

TECHNICAL FIELD

This disclosure relates generally to display devices, and, more particularly, to display devices that include a hinge mechanism for bending a flexible display.

BACKGROUND

Displays employed in electronic devices (e.g., cellular phones, portable computing devices, etc.) may be formed of a flexible substrate. The displays in some electronic devices may be folded (e.g., bent, closed, collapsed, etc.) by means of a hinge mechanism.

SUMMARY

In a general aspect, a foldable display device may include a processor, a memory, a first housing having a first end portion and a second end portion, a first length extending between the first end portion and the second end portion of the first housing, a second housing having a first end portion and a second end portion, a second length extending between the first end portion and the second end portion of the second housing, the second length being different than the first length, a flexible display coupled to the first housing and the second housing, and a hinge assembly coupled to the first housing and the second housing for relative rotation of the first housing and the second housing. The hinge assembly may include a slider, a lever attached to the slider, a set of gears disposed on the slider, and a linkage member connecting the lever and the set of gears together. Upon the relative rotation occurring in a first direction by the second housing, the set of gears rotates and causes the lever to move translationally move the first housing in a first linear direction, and upon the relative rotation occurring in a second direction by the second housing, the set of gears rotates and causes the lever to move translationally move in a second linear direction, the second linear direction being opposite to the first linear direction.

In another general aspect, a foldable display device may include a processor, a memory, a first housing having a first end portion and a second end portion, a first length extending between the first end portion and the second end portion of the first housing, a second housing having a first end portion and a second end portion, a second length extending between the first end portion and the second end portion of the second housing, the second length being different than the first length, a flexible display coupled to the first housing and the second housing, and a hinge assembly coupled to the first housing and the second housing for relative rotation of the first housing and the second housing. The hinge assembly may include a slider, a lever attached to the slider, a set of gears disposed on the slider, and a linkage member connecting the lever and the set of gears together. In a first position of the display device, a distance between an end portion of the first housing and an end portion of the slider defines a first length, and in a second position of the display device, a distance between the end portion of the first housing and the end portion of the slider defines a second length, the second length being greater than the first length

BRIEF DESCRIPTION OF THE DRAWINGS

FIGS. 5A through 5K illustrate schematic views of assembling an exemplary display device according to an example embodiment.

DETAILED DESCRIPTION

Figure 1A:
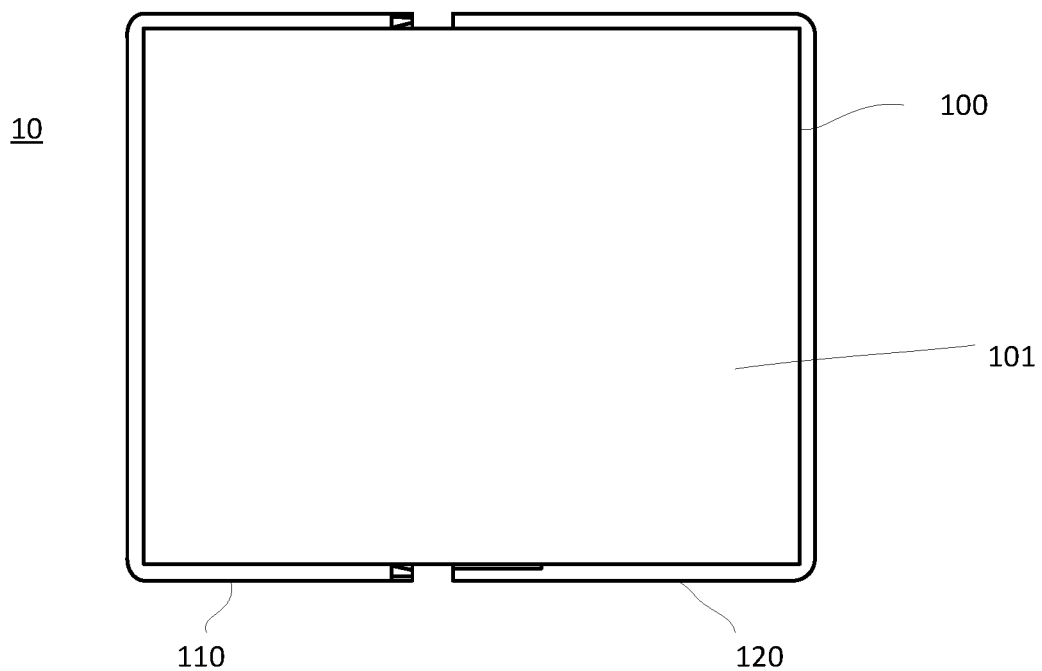
FIGS. 1A and 1B illustrate schematic views of an exemplary display device according to an example embodiment.

While example embodiments may include various modifications and alternative forms, embodiments described herein are shown by way of example in the drawings and will be described in detail. It should be understood, however, that there is no intent to limit example embodiments to the particular forms disclosed, but on the contrary, example embodiments are to cover all modifications, equivalents, and alternatives falling within the scope of the claims. Furthermore, the figures are intended to illustrate the general characteristics of methods and/or structure utilized in certain example embodiments and to supplement the written description provided herein. These figures are not, however, to scale and may not precisely reflect the precise structural or performance characteristics of any given embodiment, and should not be interpreted as defining or limiting the range of values or properties encompassed by example embodiments. For example, the structural elements may be reduced or exaggerated for clarity. The use of similar or identical reference numbers in the various drawings is intended to indicate the presence of a similar or identical element or feature.

Display devices (e.g., organic light-emitting diode (OLED) displays) may include a flexible display coupled to a housing member, which may fold or bend in a rotating manner about a hinge assembly. In some instances, the flexible display can be bent or folded such that the flexible display can face each other e.g., rotated 180°. In other words, a portion of the flexible display can be bent towards a portion of the flexible display that remains fixed or stationary. However, the bending of the flexible display may cause malfunction or breakage of the flexible display. Further, in some occasions, the bending action may cause a portion of the flexible display to become unattached (e.g., separated, decoupled, unconnected, etc.) to the housing member and form a ridge. In other words, a lifting or curling phenomenon of the flexible display caused by an excessive folding operation in an area corresponding to the hinge assembly can be formed. This causes unnecessary deformation and/or an uneven surface, which may distort images on the display.

Other flexible displays, which employ a hinge assembly, may use multiple-shaft rotation hinges to fold the display. However, flexible displays using multiple shafts rotation hinges can be complex and include many parts. This may lead to more frequent breakage and expensive repairs. In most cases, one broken shaft or hinge will require replacement of the entire hinge assembly. Other flexible displays may include a biasing member (e.g., a spring) to rotate the hinge assembly. However, in this configuration, the biasing member causes a "pop-out" action (e.g., a rapid opening of the display device) to rotate the display device to an open position. In other words, the display device opens to a predetermined angle and cannot stop at various rotation angles. Moreover, in the above configurations, the display devices are generally larger and thicker due to the various parts required.

In order to resolve the above and/or other issues, exemplary foldable display devices as described herein may include a hinge assembly having a slider mechanism and a set of gears. The slider mechanism and the set of gears operate to transfer a rotational movement into a translational movement of one of a first housing or a second housing. More specifically, the hinge assembly can transfer a rotational movement (rotatable 180°) of the flexible device to a translational movement (e.g., sliding), and bend the flexible device without damage or breakage. Further, due to the translational movement, a flexible device can be completely attached (e.g., coupled, connected, affixed, etc.) to both of the first housing and second housing during folding and/or unfolding of the flexible device. In other words, there is no lifting or curling effect formed on the flexible display.

In addition, exemplary foldable display devices include a first housing having a first size and a second housing having a second size, in which the second size of the second housing being different than the first size of the first housing. For example, the first size of the first housing can be larger than the second size of the second housing. By this configuration, such an exemplary foldable display device can be transformed into two display devices (e.g., a full-display device or a half-display device). This can provide a foldable display device that is more versatile and user friendly. For instance, in a full-display device, the flexible display may display a video content (e.g., movie, games, film, etc.) to capture a full screen mode, and in a half-display device, the flexible display may display a print content (e.g., book, newspaper, article, etc.) to enlarge a size of the print content to fit an entire display area. Moreover, thicknesses of the first housing and the second housing can be different. For example, a portion of the first housing can have a first thickness that is larger than a second thickness of the second housing. This provides a foldable display device that is relatively thin as compared to conventional display devices.

Figure 1B:
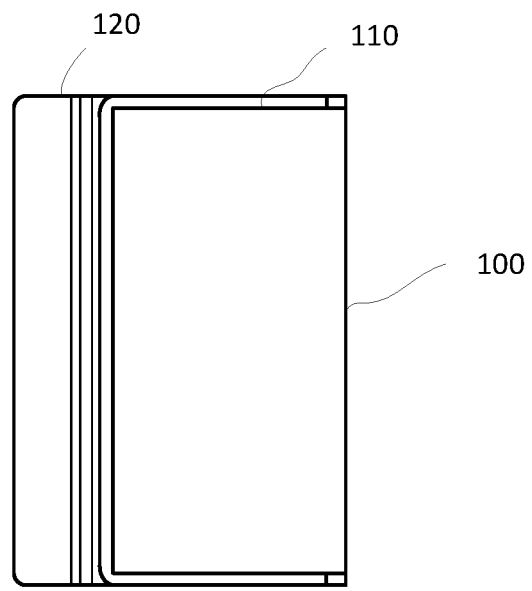

FIGS. 1A and 1B illustrate top views of an exemplary display device 10 according to an example embodiment. FIG. 1A illustrates the display device 10 in a full-display device (e.g., in a fully open position), and FIG. 1B illustrates the display device 10 in a half-display device (e.g., in a closed position or folded position). The display device 10 may be employed in a computing device such as a smart phone, a laptop computer, a tablet computer, a netbook computer, a mobile telephone, a media player, or other handheld or portable electronic device, such as a wrist-watch device. Other configurations may be used for display device 10 if desired. The example of FIGS. 1A and 1B are merely illustrative.

The display device 10 may include a flexible display 100 disposed on a first housing 110 and a second housing 120. In other words, the flexible display 100 can be coupled or attached to a surface 113 (shown in FIG. 1C) of the first housing 110 and a surface 123 (shown in FIG. 1C) of the second housing 120. In some implementations, the flexible display 100 can be coupled or attached to a portion of the surfaces 113 and 123 of the first housing 110 and the second housing 120, respectively, by adhesive. For example, the adhesive may be a pressure sensitive adhesive, a foam adhesive, or other suitable adhesive.

The flexible display 100 may include an active area 101 (e.g., display area), in which an array of pixels (not shown) are formed. Other additional components for generating a variety of signals for operating the pixels in the display area may be included, such as, for example, a display driver integrated circuit, an inverter circuit, a multiplexer, an electro-static discharge (ESD) circuit, a power supply unit, and/or the like. In some implementations, the flexible display 100 may also include components associated with functionalities other than for operating the pixels of the flexible display 100. For example, the flexible display 100 may include components for providing a touch sensing functionality, a user authentication functionality (e.g., finger print scan), a multi-level pressure sensing functionality, a tactile feedback functionality and/or various other functionalities for the electronic device employing the flexible display 100. As illustrated in the exemplary embodiment shown herein, the flexible display 100 may be rectangular shaped. Other shapes may be employed, not limited to the exemplary embodiment described herein.

In some implementations, the first housing 110 and the second housing 120 may include metal (e.g., stainless steel, aluminum or aluminum alloy, etc.). In other implementations, the first housing 110 and the second housing 120 may include plastic, glass, ceramics, rubber, and/or other suitable materials, or combination of materials. In some implementations, the first housing 110 and the second housing 120 may be formed from the same material. In some implementations, the first housing 110 and the second housing 120 may be formed from different materials. In some implementations, the first housing 110 and the second housing 120 may be formed by injection molding or formed using multiple structures.

Figure 3:
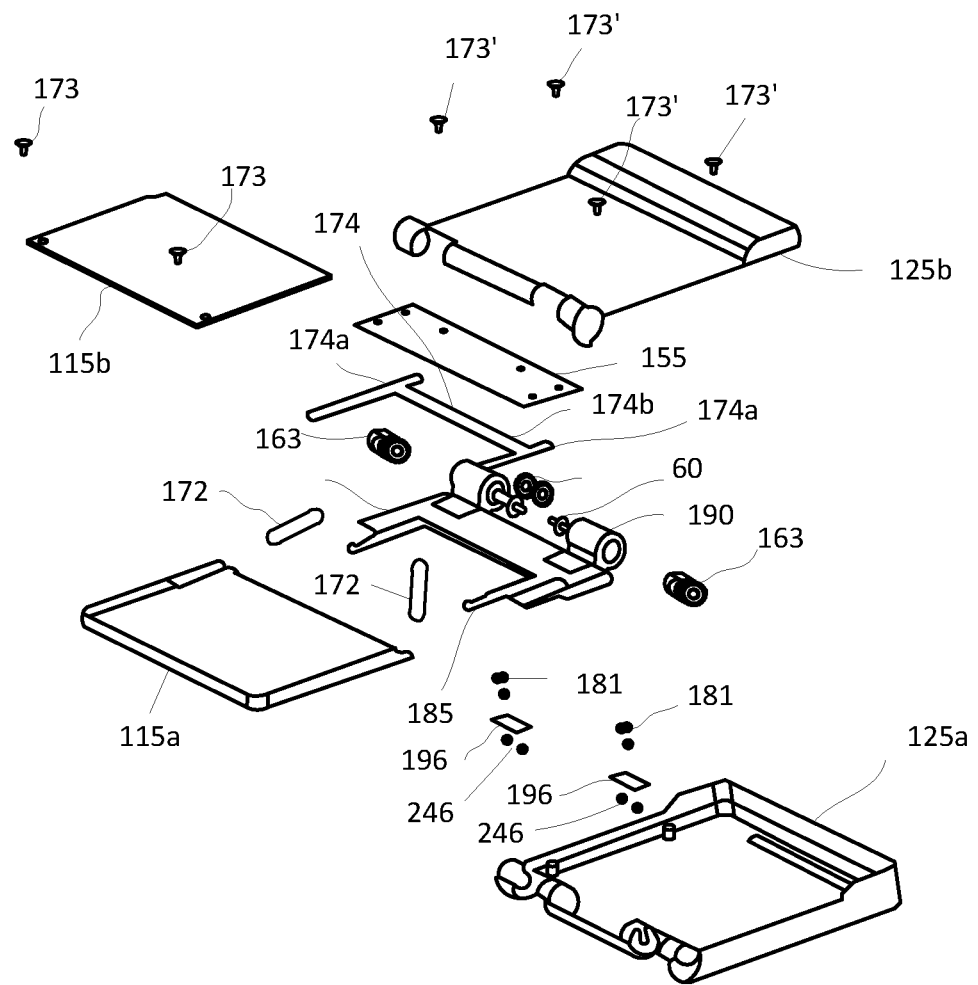
FIG. 3 is an exploded view of an exemplary display device according to an example embodiment.

Referring briefly to FIG. 3, the first housing 110 may include a first housing cover 115a and a second housing cover 115b coupled together forming an enclosure (e.g., housing, casing, etc.). The enclosure may include a cavity (e.g., opening, space, etc.) inside. Inside the enclosure the first housing 110 may contain components for performing various functions of the electronic device 10. In some implementations, the first housing cover 115a and the second housing cover 115b may be coupled together using a fastening member 173, such as, a screw, for example. Other implementations may be employed, such as, for example, other mechanical fasteners, adhesive bonding, welding, etc.

The second housing 120 may include a first housing cover 125a and a second housing cover 125b coupled together forming an enclosure inside. As similar to the first housing 110, the enclosure of the second housing 120 may include a cavity (e.g., opening, space, etc.) inside. Inside the enclosure the second housing 120 may contain components for performing various functions of the electronic device 10. For example, the components may include a camera device, a speaker device, sensors (e.g., an optical sensor, a proximity sensor, an infrared sensor, an ultrasonic sensor, etc.), a light emitting diode (LED), a microphone, a flash device, a battery, etc. The second housing 120 will contain substantially most of the components as compared to the first housing 110. With this configuration, more or additional components can be installed therein and easier to repair. In some implementations, the first housing cover 125a and the second housing cover 125b may be coupled together using a fastening member 173', such as, a screw, for example.

Other implementations may be employed, such as, for example, other mechanical fasteners, adhesive bonding, welding, etc.

Figure 1C:
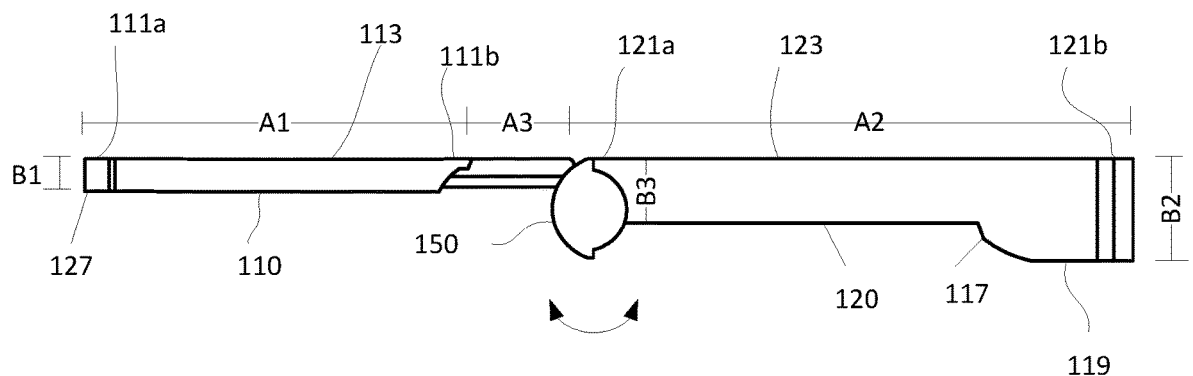
FIGS. 1C and 1D are side views of the exemplary display device shown in FIGS. 1A and 1B, respectively, according to an example embodiment.
Figure 1D:
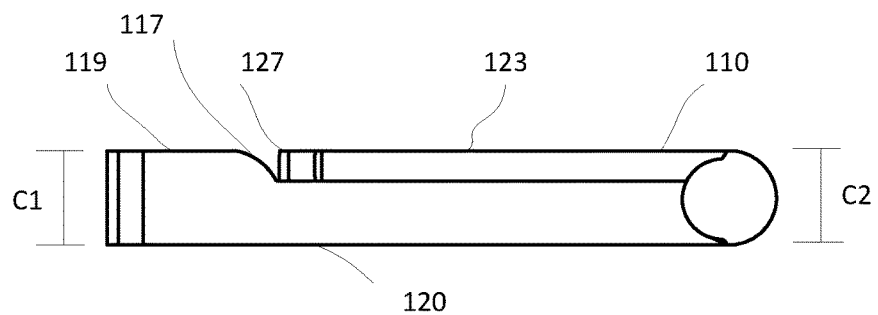

FIGS. 1C and 1D illustrate side views of the exemplary display device 10 according to an example embodiment. More specifically, FIG. 1C is a side view of FIG. 1A in the full-display device (e.g., in a fully open position); and FIG. 1D is a side view of FIG. 1B in the half-display device (e.g., in a folded position).

The first housing 110 includes a first end portion 111a and a second end portion 111b. Length A1 extends between the first end portion 111a and the second end portion 111b. The second housing 120 includes a first end portion 121a and a second end portion 121b. Length A2 extends between the first end portion 121a and the second end portion 121b. In an exemplary embodiment shown herein, lengths A1 and A2 can be different. For example, length A2 of the second housing 120 can be larger than length A1 of the first housing 110. This permits the first housing 110 to be encased (e.g., embedded, surrounded, bordered, etc.) by the second housing 120 when in its folded position. To describe in another manner, a terminal end 127 of the first end portion 111a of the first housing 110 may be adjacent to a surface portion 117 of the second end portion 121b of the second housing 120 (as shown in FIG. 1D or FIG. 4B). In some implementations, the surface portion 117 may be curved forming a space between the terminal end portion 127 and the surface portion 117. In some implementations, the surface portion 117 may be substantially 90° forming a parallel surface with respect to the terminal end 127 of the first end portion 111a.

As shown in FIG. 1C, the first housing 110 may include a first thickness B1 in the first end portion 111a and the second end portion 111b. In other words, the thickness of the first housing 110 may be the same at both of the first end portion 111a and the second end portion 111b, and thus, the first thickness B1 remains constant throughout the first housing 110. The second housing 120 may include a second thickness B2 and a third thickness B3. More specifically, the second end portion 121b of the second housing 120 may have a second thickness B2 and the first end portion 121a of the second housing 120 may have a third thickness B3. In an exemplary embodiment shown herein, thicknesses B2 and B3 can be different. For example, thickness B2 of the second end portion 121b can be larger than thickness B3 of the first end portion 121a. In some implementations, the first thickness B1 can be smaller than B2 or B3. In some implementations, each of the thickness B1 and the thickness B3 should not exceed the thickness B2. In some implementations, a combined thickness of B1 and B3 can be approximately the same as the thickness of B2. As such, when the display device 10 is in the folded position (e.g., half-display device), the surface 113 of the first housing 110 can be aligned (e.g., even, level, flat, flush, etc.) with a surface 119 (positioned near the second end portion 121b of second housing 120). Alternatively, as shown in FIG. 1D, thickness C1 is equal to thickness C2. Hence, this can provide a display device that is thinner as compared to other conventional display devices.

Figure 2A:
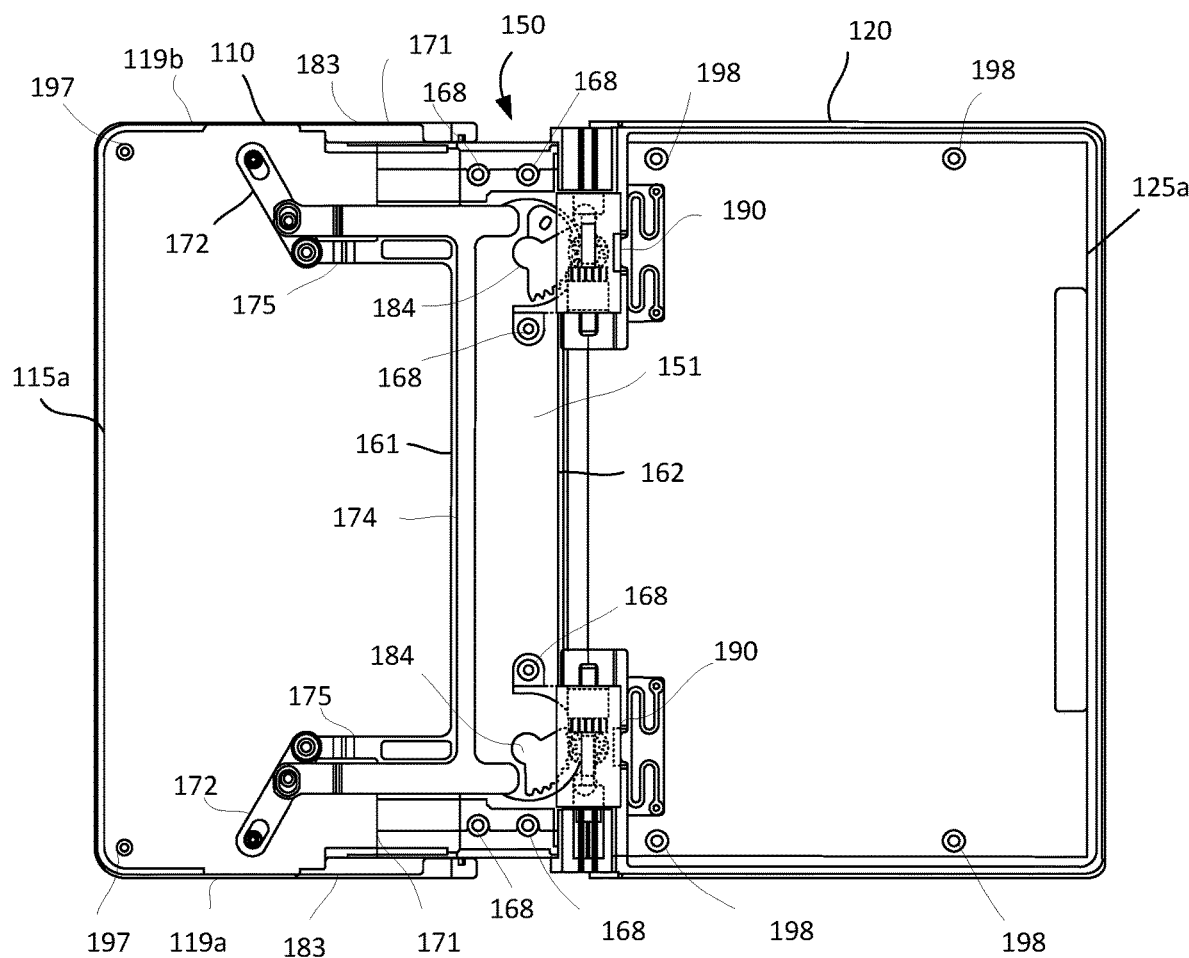
FIG. 2A is a top view of an exemplary display device without a flexible display according to an example embodiment.
Figure 2B:
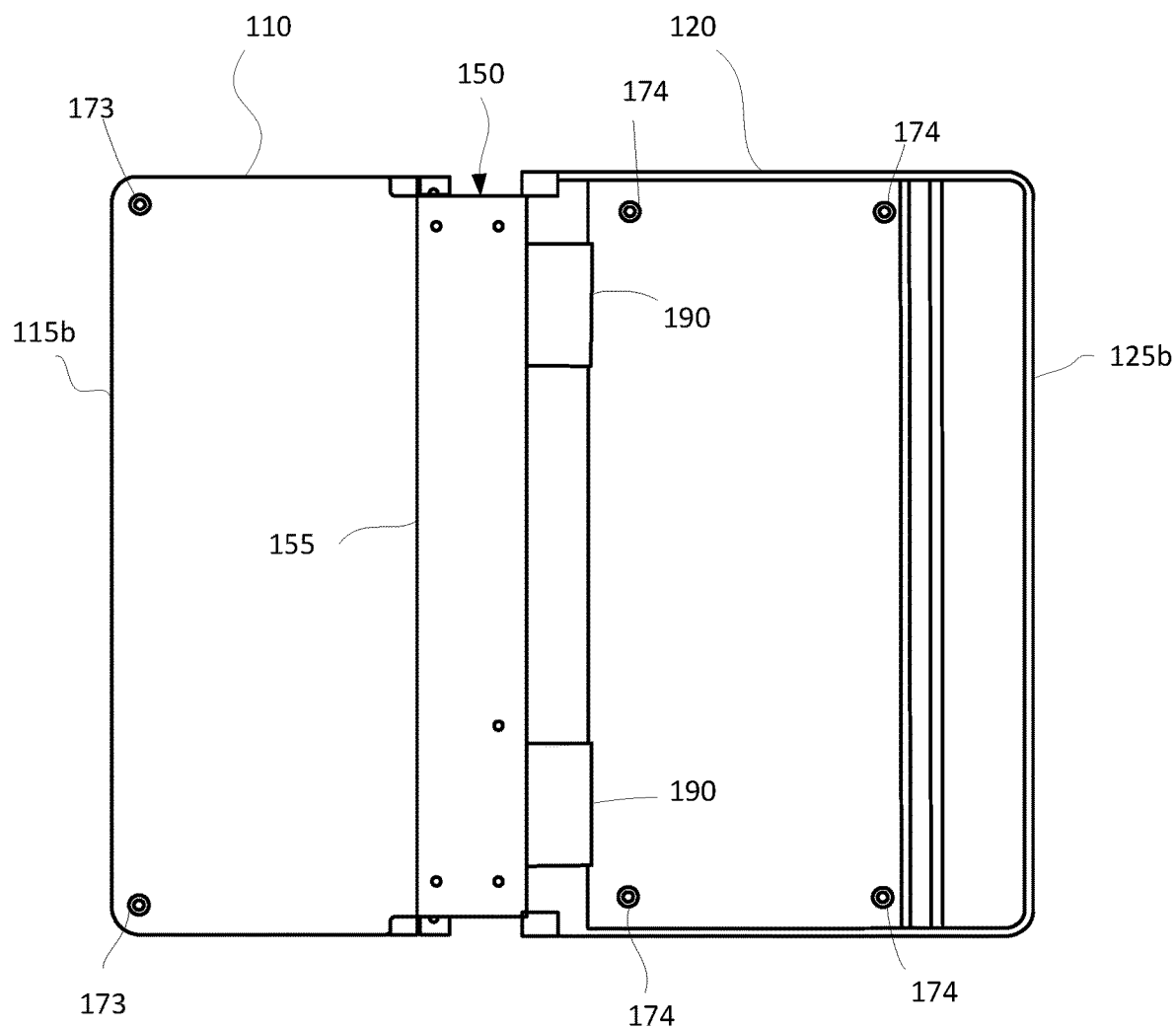
FIG. 2B is a bottom view of an exemplary display device according to an example embodiment.

FIG. 2A is a top view (without the display 100) of an exemplary display device 10 according to an example embodiment. FIG. 2B is a bottom view of an exemplary display device 10 according to an example embodiment.

Referring to FIGS. 2A and 2B, a hinge assembly 150 can be disposed between the first housing 110 and the second housing 120. In some implementations, the hinge assembly 150 can be attached (e.g., coupled, joined, etc.) to each of the first housing 110 and the second housing 120. The hinge assembly 150 may include at least a slider 151, a lever 172, a linkage 174, a spur gear 181, a sector gear 184, and a slider cover 155, which will be described in detail later.

In use, the hinge assembly 150 may operate to transfer a rotational movement into a translational movement of the first housing 110 or the second housing 120. For example, when the second housing 120 is rotated (as indicated by arrow in FIG. 1C) from a closed or folded position (as shown in FIG. 1D) to an open or unfolded position (as shown in FIG. 1C), the hinge assembly 150 may operate to transfer the rotational movement of the second housing 120 into the translational movement of the first housing 110. That is, the first housing 110 attached to the hinge assembly 150 has moved (e.g., slid) a length A3. Due to the translational movement caused by the hinge assembly 150, the flexible display 100 can be substantially attached (e.g., coupled, connected, affixed, etc.) to the first housing 110 and the second housing 120 during folding and unfolding of the display device 10. Thus, there is no lifting or curling formed on the flexible display 100.

As shown in FIG. 2A, the hinge assembly 150 may include the slider 151 disposed between the first housing 110 and the second housing 120. More specifically, the slider 151 can be coupled to the first housing cover 115a of the first housing 110 and the first housing cover 125a of the second housing 120. The slider 151 may include a first side end portion 161 and a second side end portion 162. In some implementation, the first side end portion 161 of the slider 151 may be coupled to a portion of the first housing cover 115a of the first housing 110 and the second side end portion 162 may be coupled to a portion of the first housing cover 125a of the second housing 120.

In some implementations, the slider 151 may be formed from metal (e.g., stainless steel, aluminum or aluminum alloy, etc.). In other implementations, the slider 151 may be made from plastic, glass, ceramics, rubber, or other suitable materials, or combination of materials. In some implementations, the slider 151 may be made from the same material as the first housing 110 and/or the second housing 120. In some implementations, the slider 151 may be made from the different material as the first housing 110 and/or the second housing 120.

The slider 151 may include an extension member 171 on the first side end portion 161 and extend outwardly from the first side end portion 161 of the slider 151. In other words, the extension member 171 may extend in an orthogonal direction with respect to the first side end portion 161. The extension member 171 may be used to connect (e.g., attach, couple, join, link, etc.) the slider 151 to the first housing cover 115a of the first housing 110.

According to an example embodiment, although one pair of extension members 171 having the same structure formed on the slider 151 in the following description, only one extension member 171 will be described. However, it is apparent that the other extension member 171 may have the same structure. Further, although a structure in which one pair of extension members 171 is illustrated and described, the present disclosure is not limited thereto. For example, one extension member 171 may present, or three or more extension members 171 may be present.

In some implementations, the extension member 171 can slide into a groove 183 (e.g., channel) formed in the first housing cover 115a of the first housing 110. In some implementations, the groove 183 may be an elongate member that is to receive the extension member 171. More specifically, the groove 183 may receive a portion of the extension member 171 (e.g., long side portion) such that the extension member 171 may move (e.g., slide back and forth) within the groove 183 based on the movement of the second housing 120. In some implementations, the groove 183 may be formed at a portion of each side end portion 119a, 119b of the first housing cover 115a. In some implementations, the groove 183 may be integrally formed with the first housing cover 115a. In some implementations, the groove 183 may be a separate piece and fastened to the first housing cover 115a. In some implementations, the extension member 171 should have similar shape and size as the groove 183 so to provide a complementary fit within the groove 183. In an exemplary embodiment as described herein, the extension member 171 has a substantially rectangular shape. Other shapes and sizes of the extension member 171 may be employed as long as the extension member 171 corresponds to the shape and size of the groove 183. In some implementations, lubricant, such as, for example, TEFLON lubricant may be used between the extension member 171 and the groove 183 to reduce friction and protect moving parts and prevent rust.

Figure 4A:
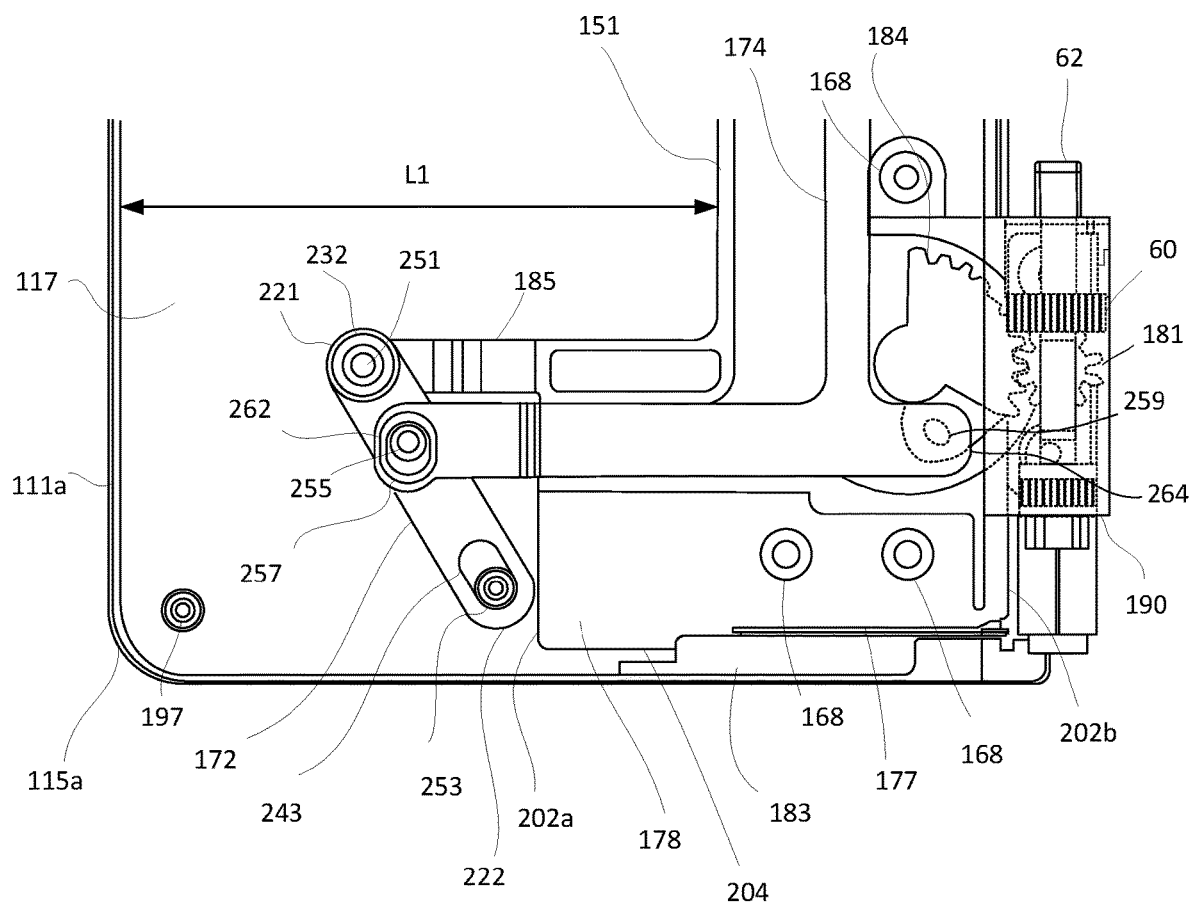
FIGS. 4A and 4B are schematic views of a portion of a hinge assembly of an exemplary display device according to an example embodiment.
Figure 4B:
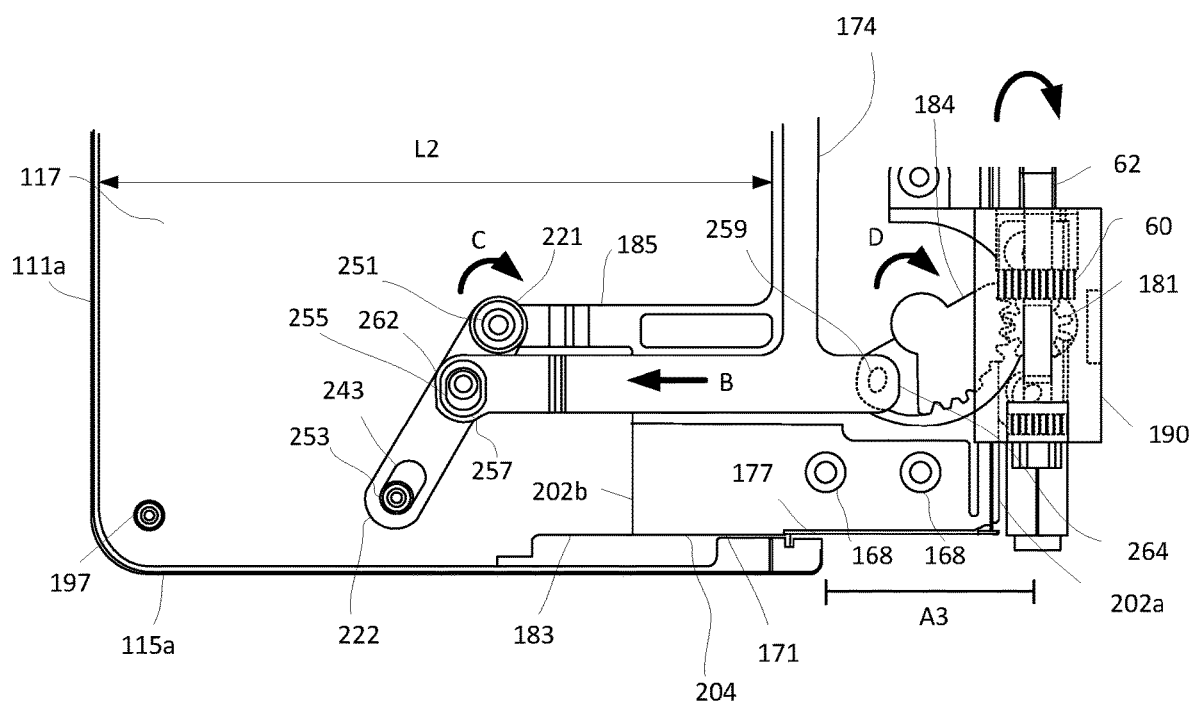

In some implementations, the extension member 171 may include a guiding member 177 on a surface 178 of the extension member 171, as shown in FIGS. 4A and 4B. In some implementations, the guiding member 177 may be formed on the surface 178 of the extension member 171 extending between a first end portion 202a and a second end portion 202b of the extension member 171. As illustrated in example embodiments described herein, the guiding member 177 may extend from the first end portion 202a of the extension member 171 to a middle portion of the extension member 171. In other implementations, the guiding member 177 may extend from the first end portion 202a to the second end portion 202b of the extension member 171. In some implementations, the guiding member 177 may be located at one longitudinal side end portion 204 of the extension member 171. More specifically, the guiding member 177 may be located near the longitudinal side end portion 204 that engages the groove 183 formed on the first housing cover 115a. The guiding member 177 may be formed on the extension member 171 to guide the extension member 171 and ensure that the extension member 171 stays within (e.g., engage) the groove 183. In other words, the guiding member 177 ensures that the extension member 171 does not disengage with the first housing cover 115a of the first housing 110.

On the second side end portion 162 of the slider 151, a gear housing 190 may be formed thereof. The gear housing 190 may house at least a shaft gear 60 that engages with the spur gear 181 and the sector gear 184 in the slider 151, which will be described later in detail herein. In some implementations, the gear housing 190 may be a substantially cylindrical structure. The gear housing 190 may correspond to a shape of the shaft gear 60 disposed therein and can protect shaft gear 60 from damage and mis-alignment. In other words, a size of an inner bore of the gear housing 190 should be sufficient to accommodate the shaft gear 60. The gear housing 190 can be configured to be coupled to the first housing cover 125a of the second housing 120. More specifically, the gear housing 190 can be coupled to a connection member 188 formed on the first housing cover 125a, as shown in FIG. 5H. The gear housing 190 can cooperatively engage with the connection member 188 due to the gear housing 190 and the connection member 188 having substantially similar shape. In some implementations, the connection member 188 may include a first connecting portion 188a and a second connecting portion 188b spaced apart from each other. Due to the spacing of the first connecting portion 188a and the second connecting portion 188b, an opening 195 can be formed between the first and second connecting portions 188a, 188b. A size and shape of the opening 195 should correspond to a size and shape of the gear housing 190 for engagement. The engagement of the gear housing 190 in the opening 195 should be tight such that the gear housing 190 does not move within the opening 195 when engaged. In some implementations, one of the first connection portion 188a and the second connection portion 188b may include a slot 189 formed at a sidewall 193, as shown in FIG. 5H. The slot 189 cooperatively receives a shaft 62 of the shaft gear 60 disposed in the gear housing 190. That is, the shaft 62 of shaft gear 60 may slide into the slot 189 and may affix (e.g., connect, attach, etc.) the shaft gear 60 to the connection member 188 of the first housing cover 125a. Therefore, the gear housing 190 at the second side end portion 161 of the slider 151 can be coupled to the first housing cover 125a of the second housing 120.

According to an example embodiment, although one pair of gear housing 190 having the same structure and one pair of connection member 188 having the same structure are coupled to each other in the description, only one gear housing 190 and connection member 188 will be described. However, it is apparent that the other gear housing 190 and connection member 188 may have the same structure. Further, although a structure in which one pair of gear housings 190 and one pair of connection members 188 are illustrated and described, the present disclosure is not limited thereto. For example, one gear housing 190 and connection member 188 may be present, or three or more gear housings 190 and connection members 188 may be present.

FIGS. 4A and 4B illustrate schematic views of a portion of a hinge assembly according to an example embodiment. FIG. 4A illustrates a folded state of the display device, and FIG. 4B illustrates an unfolded state of the display device.

Referring to FIG. 4A, the slider 151 may include the lever 172 coupled to a shifting member 185 which moves based on an unfolding or unfolding motion of the display device 10. The shifting member 185 may include a hole 187 (shown in FIG. 5A) at one end of the shifting member 185 to interlock with the lever 172. More specifically, the hole 187 of the shifting member 185 may correspond (e.g., aligned) with a hole 232 of the lever 172 and affixed together at a connection pin 251 formed on a surface 117 of the first housing cover 115a.

In some implementations, the shifting member 185 may extend from the first side end portion 161 of the slider 151. In some implementations, the shifting member 185 may extend farther than the extension member 171 in relation to the slider 151. In other words, the shifting member 185 may extend farther away from the first side end portion 161 than the extension member 171. In some implementations, the shifting member 185 may be integrally formed with the extension member 171. In other implementations, the shifting member 185 may be a separate element than the extension member 171.

The lever 172 may include a first end portion 221 affixed at the connection pin 251 formed on the shifting member 185, and a second end portion 222 affixed at a connection pin 253 formed on the surface 117 of the first housing cover 115a. A long hole 243 may be formed on the second end portion 222 so that a rotation movement of the lever 172 may cause a linear movement of the slider 151. For example, the lever 172 rotates depending on the movement of the shifting member 185, and the slider 151 moves by the rotation of the lever 172.

Referring to FIG. 4B, when the display device 10 is in the open or unfolded position, the shifting member 185 may move in a direction in which the lever 172 is rotated. As described in an example implementation, the lever 172 may be rotated in a counter-clockwise direction, and hence, the shifting member 185 may move (e.g., slide) toward a direction of arrow B. In other words, the lever 172 may be rotated in a direction of arrow C about connection pin 253 and the shifting member 185 of the slider 151 may be moved in the direction of arrow B in an interlocking manner. Accordingly, the display device 10 may move depending on the movement of the slider 151. For example, when the display device 10 is in the closed or folded position, the slider 151 has a first length L1, which is a distance between the first end portion 111a of the first housing cover 115a and the first side end portion 161 of the slider 151, and when the display device 10 is in the open or unfolded position, the slider 151 has a second length L2, which is a distance between the first end portion 111a of the first housing cover 115a and the first side end portion 161 of the slider 151. In this example implementation, the second length L2 can be greater than the first length L1. This is due to the slider 151 having been moved a distance A3 from its initial position.

Further, the slider 151 may include the linkage 174 connecting the lever 172 and the sector gear 184 and move in an interlocking manner. In some implementations, the linkage 174 may include a hole 257 at a first end portion 262 of the linkage 174 to interlock with a connection pin 255 formed on the lever 172. Further, the linkage 174 may include an opening at a second end portion 264 to interlock with a connection pin 259 located on the sector gear 184 to move (e.g., slide) the linkage 174. That is, the sector gear 184 can be rotated such that the sector gear 184 causes the lever 172 to move via the linkage 174 depending on whether the display device 10 is in an open or closed position. In this case, when the display device 10 is moved from a closed (or folded) position to an open (or unfolded) position, the sector gear 184 can be rotated in a direction of arrow D (e.g., clockwise), which may cause the lever 172 to move in the direction of arrow B (e.g., left wise direction as shown in FIG. 4B). As a result, a distance A3 (or stroke) is created between the first housing 110 and the second housing 120. In addition, due to the movement of the linkage 174 in the direction of arrow B, this may cause the lever 172 to move in the same direction as arrow B. As previously discussed, this creates the length L2 between the first end portion 111a of the first housing cover 115a and the first side portion 161 of the slider 151 to be larger as compared to when the display device 10 is in the closed (or folded) position. In one example implementation, the sector gear 184 can be rotated approximately 30°. Other rotational angle may be employed as long the sector gear 184 moves the linkage 174 to the desired translational movement.

In some implementations, the connection pin 255 may be formed on a surface of the lever 172 near a middle portion of the lever 172. In some implementations, the hole 257 may be a long hole such that a rotational movement of the sector gear 184 may cause a linear movement of the linkage 174. That is, the sector gear 184 rotates depending on the movement of the linkage 174, and the linkage 174 moves by the rotation of the sector gear 184.

In some implementations, the linkage 174 may include two short portions 174a connected by one long portion 174b between the two short portions 174a (as shown in FIG. 3). In other words, the linkage 174 may include a first and a second arm 174a and a connection arm 174b connecting the first and second arms 174a. In some implementations, the linkage 174 may be substantially H-shaped. Other shapes may be employed as long as the linkage 174 can be configured to connect the lever 172 and the sector gear 184 and move in an interlocking manner.

In addition, the sector gear 184 can mesh with the spur gear 181 located in the gear housing 190. The spur gear 181 transmits a drive torque to the sector gear 184, which may cause a translational movement (e.g., linear, sliding, horizontal, etc.) of the linkage 174. In some implementations, the spur gear 181 can also mesh with the shaft gear 60 located in the gear housing 190. In this case, the shaft gear 60 can be positioned in a vertical direction corresponding to a rotational movement of the second housing cover 125a. The shaft gear 60 transmits a drive torque to the spur gear 181 in the vertical direction, and subsequently, the spur gear 181 transmits a drive torque to the sector gear 184.

In operation, when the second housing 120 is rotated from a folded position to an unfolded position, the shaft gear 60 rotates, via a shaft 62 attached to the second housing 120, to cause the spur gear 181 to correspondingly rotate, while meshed with the shaft gear 60. Then the rotating spur gear 181 causes the sector gear 184 to correspondingly rotate while meshed with the spur gear 181. Hence, the rotational movement of the shaft gear 60 provides the drive torque to rotate the sector gear 184. In other words, the hinge assembly 150 may operate to transfer the rotational movement of the second housing 120 (via the shaft gear 60) into the translational movement of the first housing 110 (via the sector gear 184). Consequently, the first housing 110 attached to the hinge assembly 150 has moved (e.g., slid) a stroke having a length A3. Due to the translational movement caused by the hinge assembly 150, the flexible display 100 can be substantially attached (e.g., coupled, connected, affixed, etc.) to the first housing 110 and the second housing 120 during folding and unfolding of the display device 10. Thus, there is no lifting or curling formed on the flexible display 100. Accordingly, the hinge assembly 150 has moved (e.g., translational movement) a distance as indicated by the length A3. This translational (e.g., linear, sliding, etc.) movement should correspond to the rotational movement of the second housing 120 or vice versa. For example, when the second housing 120 is rotated (e.g., 180 degrees), the hinge assembly 150 can be moved proportionally the length A3. Consequently, if the second housing 120 is rotated only 90 degrees, the hinge assembly 150 can be moved proportionally half of distance of length A3. Other rotated angles between 0 to 180 degrees may be operated such that a distance of the hinge assembly 150 can be moved proportionally.

As illustrated in exemplary embodiments described herein, the shaft gear 60 may have a gear module of 0.5 having 10 teeth, the spur gear 181 may have a gear module of 0.5 having 10 teeth, and the sector gear 184 may have a gear module of 0.5 having 30 teeth. Other gear profiles, gear modules, and number of teeth may be employed as long as a gear ratio matches a translational ratio to move the first and second housings 110, 120.

In some implementations, the hinge assembly 150 can be modified while utilizing same set of gears. In other words, the gear modules of the shaft gear 60, the spur gear 181 and/or the sector gear 184 do not need to be modified to change a profile of translational movement. For example, in order to change the profile of translational movement, adjustments of a location of the connection pin 259 located in the sector gear 184 and a length of the linkage 174 can be made to provide a different stroke distance. Because flexible displays can have different characteristics and properties or require other elements or layers, different strokes are needed to properly attach the flexible display to the display device 10. In this case, adjusting the location of the connection pin 259 on the sector gear 184 and corresponding adjusting the length of the linkage 174 can be made of potentially different neutral planes for different display types, while using the same sector gear 184. Accordingly, the exemplary display device 10 can be advantageous over conventional display devices in that redesign is easier and simpler, e.g., adjustments of gear profiles or modules are not required.

Figure 5D:
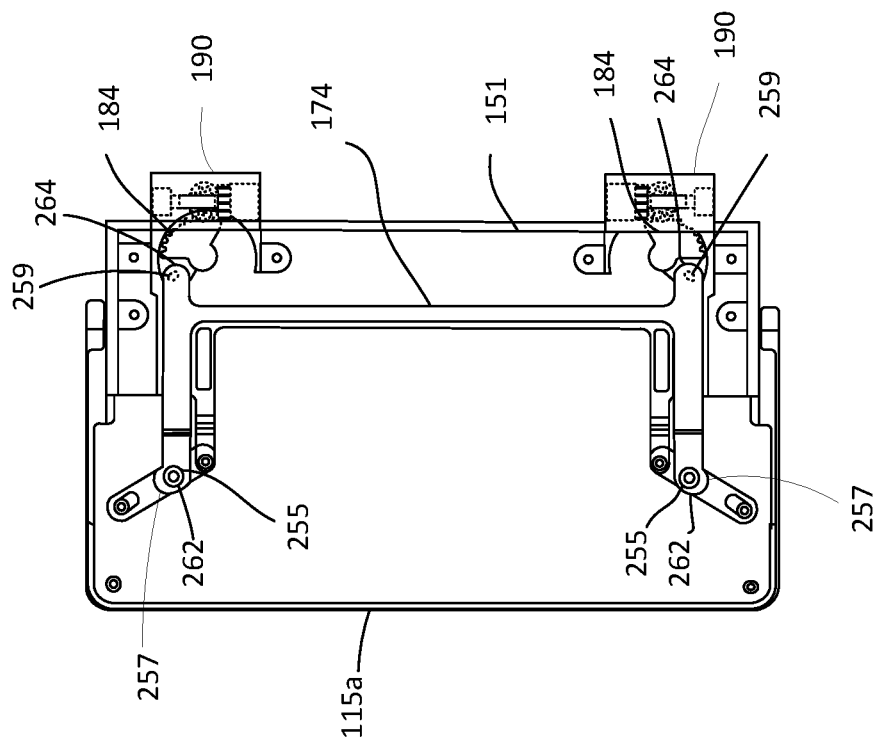
Figure 5C:
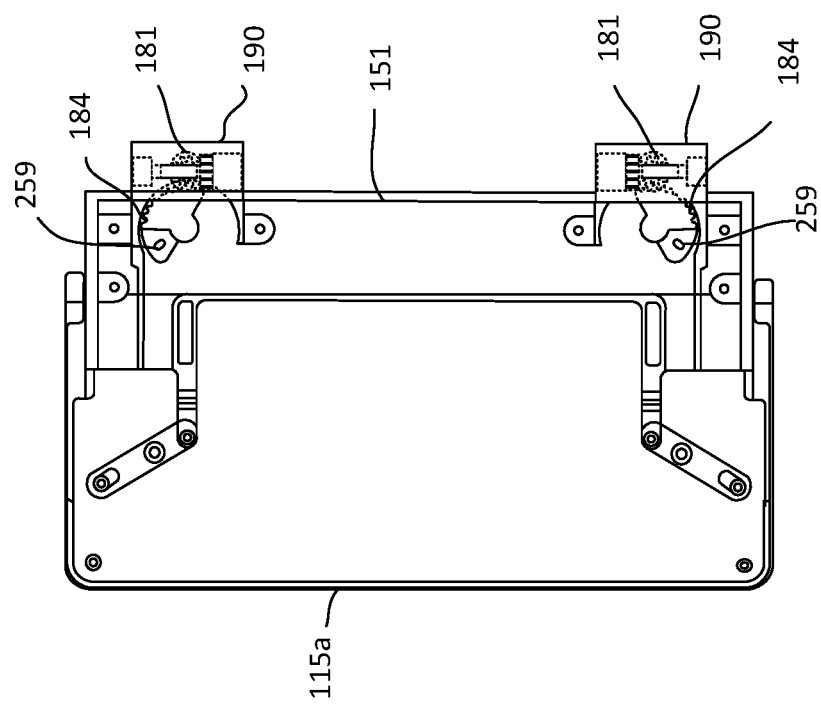
Figure 5G:
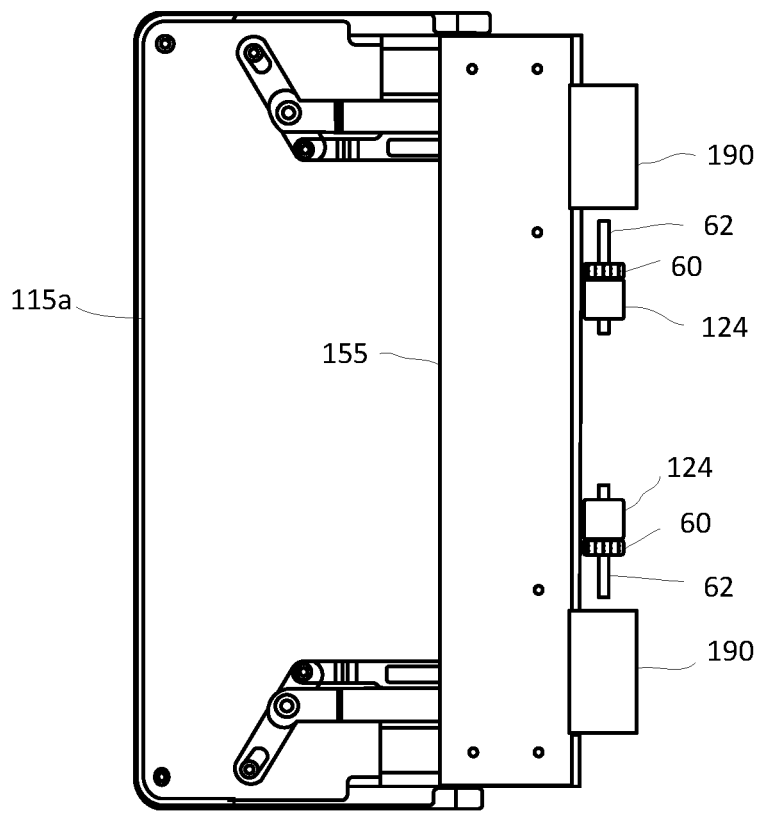
Figure 5H:
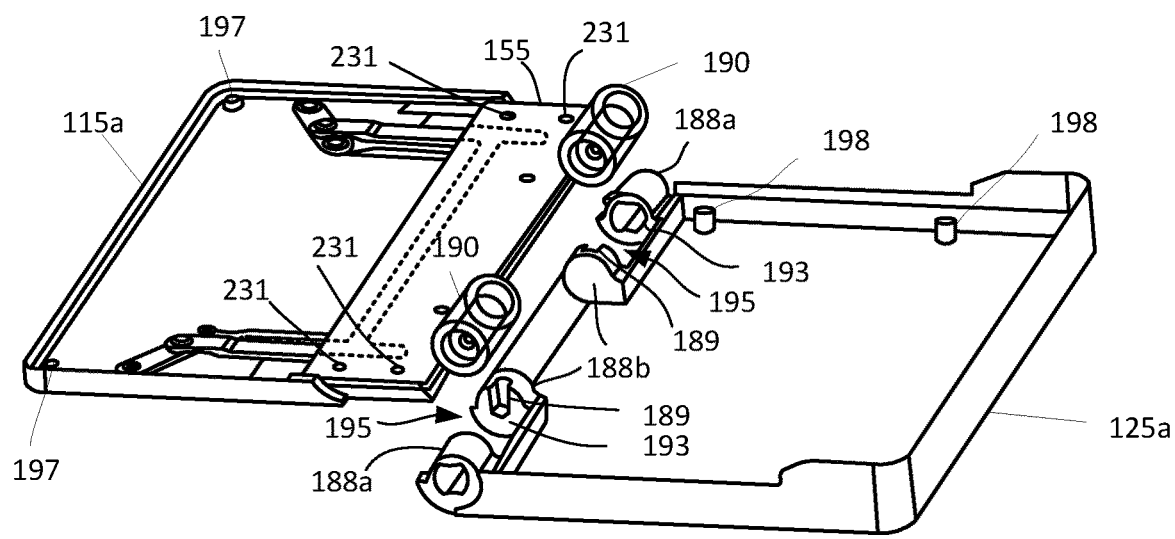
Figure 5I:
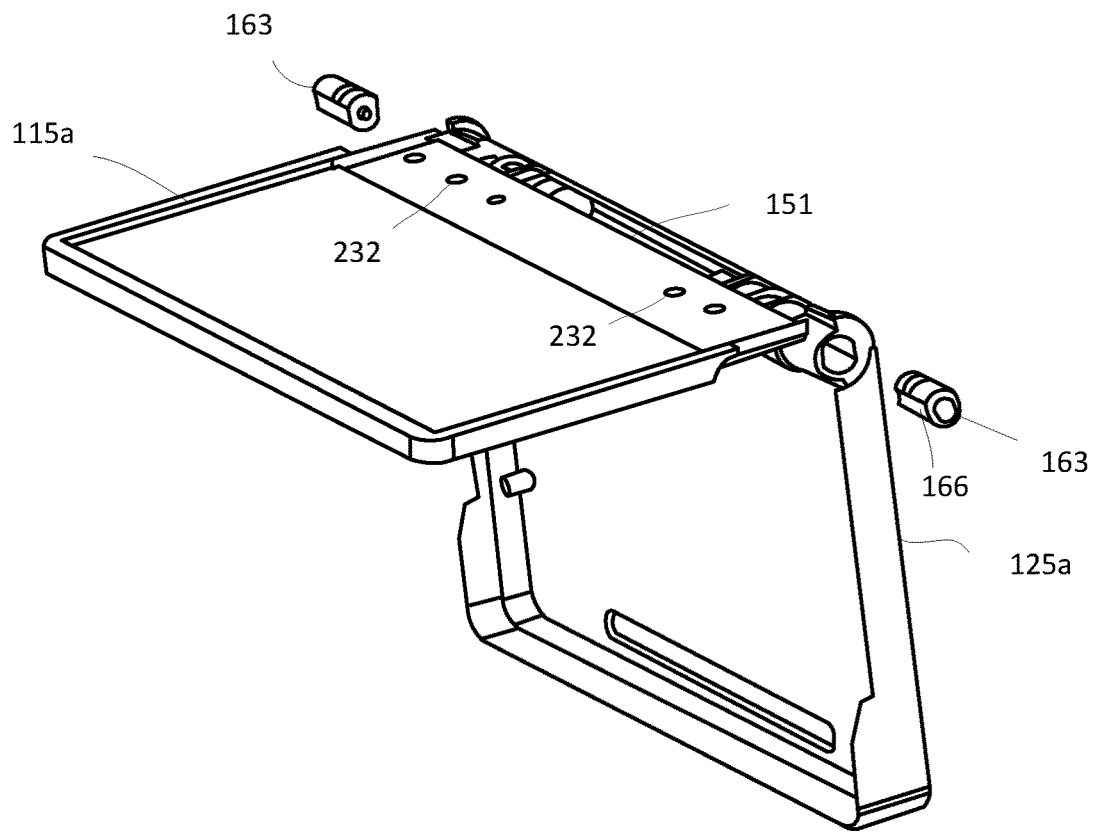
Figure 5J:
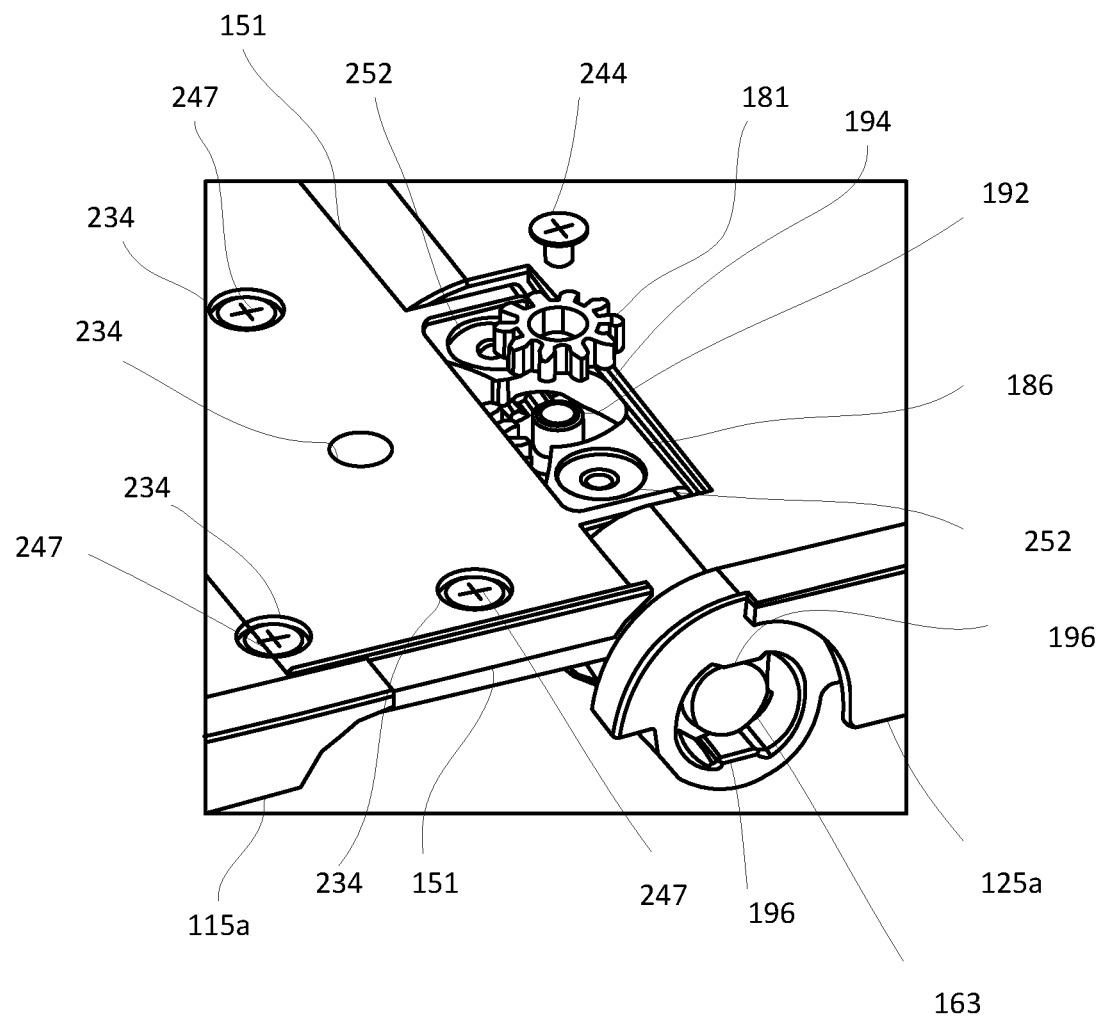

Referring to FIG. 5J, the spur gear 181 may be attached to the slider 151 corresponding to the gear housing 190. More specifically, the spur gear 181 may be coupled to the slider 151 at a bottom surface portion 186 of the slider 151 where the gear housing 190 is located. In some implementations, the spur gear 181 may be coupled to a screw boss 192 formed in the gear housing 190. In other words, the spur gear 181 may be inserted into an opening 194 formed in the gear housing 190 and fitted into the screw boss 192 having an outer diameter that corresponds to an inner diameter of the spur gear 181. The outer diameter of the screw boss 192 should be substantially the same to the inner diameter of the spur gear 181 to provide a tight fit. In some implementations, the spur gear 181 can be secured to the screw boss 192 with a fastener 244, such as, a screw. Other fasteners, including but not limited to, nut and bolt, claps, clips, staples, glue, adhesive, etc. may be employed to attach the spur gear 181 to the slider 151.

While exemplary embodiments described herein illustrate a spur gear, other types of gears may be employed, such as, but not limited to, a worm gear, a helical gear, a bevel gear, a spiral gear, a crown gear, a hypoid gear, a rack and pinion, etc.

Further, at the bottom surface 186 of the gear housing 190, a hole 252 may be formed to securely attach the slider 151 to the first housing cover 125a of the second housing 120. In some implementations, the hole 252 may be a counterbore hole to receive a fastener 246 (shown in FIG. 5K). In an example embodiment shown herein, there may be two holes 252 formed on the bottom surface 186. More specifically, there may be one hole 252 between the opening 194 formed in the gear housing 190. Other implementations may contain less or more holes 252 on the bottom surface 186 of the gear housing 190.

Figure 5K:
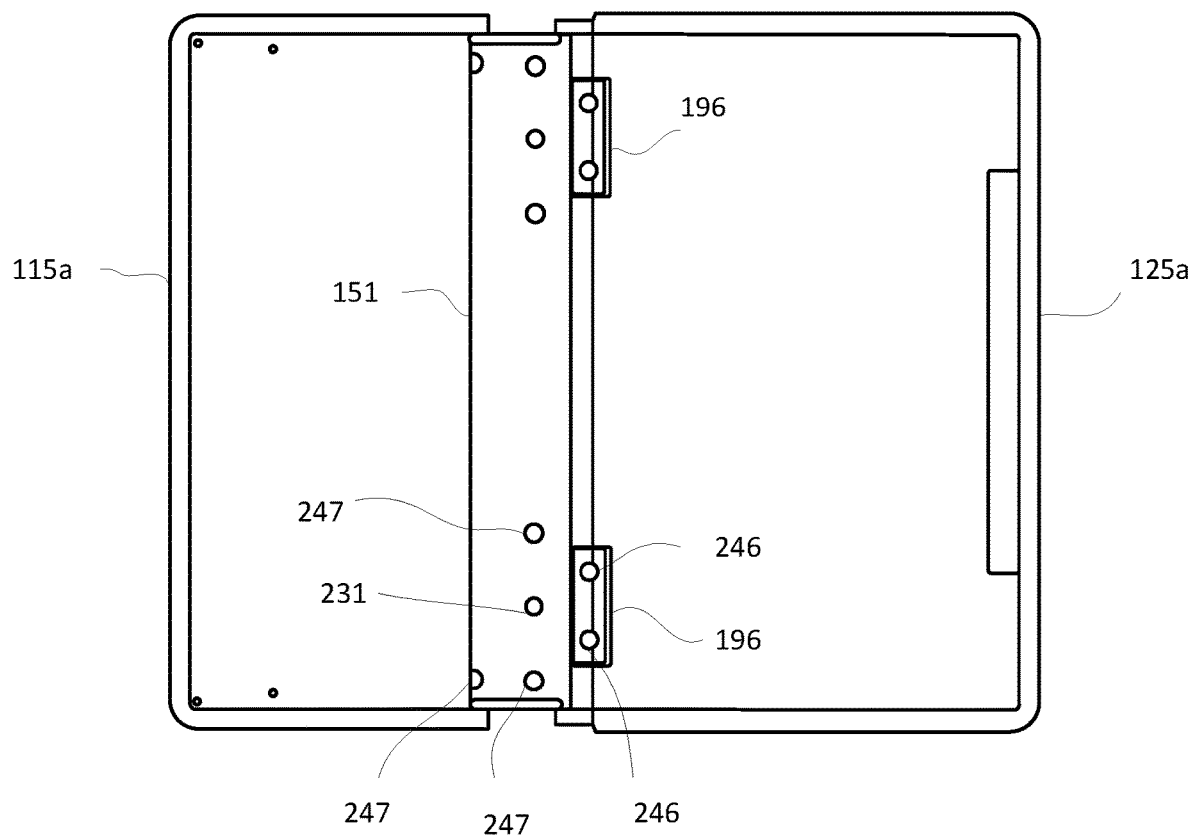

As shown in FIG. 5K, a gear housing cover 196 may cover the bottom surface portion 186 of the slider 151. In some implementations, the gear housing cover 196 may be secured to the bottom surface portion 186 of the slider 151 with the fastener 246. Other fasteners, including but not limited to, nut and bolt, claps, clips, staples, glue, adhesive, etc. may be employed to attach the gear housing cover 196 to the bottom surface portion 186 of the slider 151.

Referring to FIG. 5I, a free-stop hinge device 163 may be disposed in the first housing cover 125a of the second housing 120. In some implementations, the free-stop hinge device 163 may be disposed in the connection member 188 of the first housing cover 125a. More specifically, the free-stop hinge device 163 may be disposed in the second connecting portion 188b (as shown in FIG. 5H) of the connection member 188. The free-stop hinge device 163 may provide a force for stopping the second housing 120 at various angles (e.g., 0° to 180°). For example, the free-stop hinge device 163 may stop at approximately 0°~15°, 15°~165°, and 165°~180°.

In some implementations, the free-stop hinge device 163 may include a slot member 166. In some implementations, the slot member 166 may be located on two sides of the free-stop hinge device 163. At an inner surface of the first connection portion 188a of the connection member 188, a rib 196' may be formed to correspond to the slot member 166 of the free-stop hinge device 163 (as shown in FIG. 5J). In other words, when the free-stop hinge device 163 is inserted into the first connection portion 188a, the slot member 166 should be aligned with the rib 196' and placed inside the first connection portion 188a to be secured. The free-stop hinge device 163 can then rotate with the first connection portion 188a at various angles. In some implementations, the slot member 166 can have other shapes and sizes as long the slot member 166 corresponds to the rib 196 of the first connection portion 188a.

Referring to FIG. 5H, the slider 151 may be covered with a slider cover 155 to enclose and protect the components (e.g., gears, linkage, etc.) inside thereof. In some implementations, the slider cover 155 may include a plurality of holes 231 to align with a plurality of holes 168 in the slider 151. In some implementations, the plurality of holes 231 may be align with a screw boss 168 (as shown in FIG. 2A) in the slider 151. In some implementations, the hole 231 may be a counterbore hole. In some implementations, the slider cover 155 may be attached to the slider 151 via fasteners 248, such as, screws. Other fasteners, including but not limited to, nut and bolt, claps, clips, staples, glue, adhesive, etc. may be employed to attach the slider cover 155 to the slider 151. In some implementations, the slider cover 155 may be formed from a metal (e.g., stainless steel, aluminum or aluminum alloy, etc.) material. Other types of materials may be used, such as, but not limited to, a plastic material and/or other polymeric material.

FIGS. 5A through 5K illustrate schematic views of assembling an exemplary display device 10 according to an example embodiment. As shown in FIG. 5A, the slider 151 can be coupled to the first housing cover 115a of the first housing 110 in accordance to example embodiments. In some implementations, the slider 151 can be coupled to the first housing cover 115a by inserting the extension member 171 of the slider 151 into the groove 183 formed in the first housing cover 115a.

As shown in FIG. 5B, once the slider 151 is coupled to the first housing cover 115a, the lever 172 may be attached to the slider 151. More specifically, the first end portion 221 of the lever 172 may be affixed at the connection pin 251 formed on the shifting member 185, and the second end portion 222 of the lever 172 may be affixed at the connection pin 253 formed on the surface 117 of the first housing cover 115a. In some implementations, the lever 172 may be affixed to the respective connections pins 251 and 253 with a mechanical fastener, such as a screw, for example.

Next, as shown in FIG. 5C, the sector gear 184 may be installed on the slider 151. In some implementations, the sector gear 184 may include a protrusion (not shown) on a surface thereof and inserted into a hole 287 (as shown in FIG. 5A) located on the slider 151. In some implementations, the sector gear 184 may rotate approximately 30° when inserted into the hole 287. The sector gear 184 may mesh with the spur gear 181 located in the gear housing 190. This permits the translational movement (e.g., linear, sliding, etc.) of the slider 151 as previously discussed.

Referring to FIG. 5D, the linkage 174 may be installed onto the slider 151. In some implementations, the hole 257 at the first end portion 262 of the linkage 174 may interlock with the connection pin 255 formed on the lever 172, and the opening at the second end portion 264 may interlock with the connection pin 259 located on the sector gear 184 to move (e.g., slide) the linkage 174. When the sector gear 184 is rotated, this causes the lever 172 to move via the linkage 174 depending on whether the display device 10 is in an open or closed position. For example, when the display device 10 is moved from a closed (or folded) position to an open (or unfolded) position, the sector gear 184 rotates, which causes the linkage 174 to concurrently move due to the linkage 174 being connected to the sector gear 184. This result in the slider 151 moving in a translational movement and creating a distance A3 (or stroke) between the first housing 110 and the second housing 120. To describe in another manner, during the open (or unfolded) position of the display device 10, the length L2 between the end portion 111a of the first housing cover 115a and the slider 151 can be larger as compared to when the display device 10 is in the closed (or folded) position. In some implementations, the linkage 174 may be affixed to the respective connections pins 255 and 259 with a mechanical fastener, such as a screw, for example.

Referring to FIG. 5E, the slider cover 155 may be installed on the slider 151. The slider cover 155 helps protect the slider 151 and any components inside of the first housing 110. In some implementations, the slider cover 155 may include holes 231 to correspond with the screw bosses 168 formed in the slider 151. In some implementations, the slider cover 155 may be attached to the slider 151 with a mechanical fastener 248, such as a screw, for example.

Referring to FIG. 5F, which is an opposite view of FIG. 5E, the slider 151 can then be secured to the first housing cover 115a on a bottom surface portion of the slider 151. In some implementations, at the bottom surface portion of the slider 151, holes 234 may be formed to correspond with the screw bosses 168 formed in the inside of the slider 151. In some implementations, the bottom surface portion of the slider 151 may be secured to the screw bosses 168 with a mechanical fastener 247, such as a screw, for example.

Referring to FIG. 5G, the shaft gear 60 may then be inserted into the gear housing 190. In some implementations, the shaft gear 60 may be mounted on a shaft 62. Then the shaft gear 60 may be assembled with a bushing 124 to provide a bearing surface for the shaft gear 60. In some implementations, the bushing 124 may be made of rubber (or synthetic rubber or polyurethane), for example. Next, the assembled shaft gear 60 and bushing 124 can be inserted into the gear housing 190.

Referring to FIG. 5H, the first housing cover 115a of the first housing 110 can be coupled to the first housing cover 125a of the second housing 120. In some implementations, the gear housing 190 can be inserted into the opening 195 of the first housing cover 125a. More specifically, the gear housing 190 holding the assembled shaft gear 60 can be affixed between the first connection portion 188a and the second connection portion 188b. In some implementations, the second connection portion 188b may include the slot 189 formed at the sidewall 193 so as to receive the shaft 62 of the shaft gear 60 disposed in the gear housing 190. During assembly, the shaft 62 of shaft gear 60 may slide into the slot 189 and affix the shaft gear 60 to the second connection portion 188b.

Referring to FIG. 5I, the free-stop hinge device 163 can be installed in the first housing cover 125a of the second housing 120. In some implementations, the free-stop hinge device 163 can be installed (e.g., pushed) in the first connection portion 188a formed on the first housing cover 125a. In order to ensure that the free-stop hinge device 163 is in a proper position (e.g., aligned) for insertion, the first housing cover 125a of the second housing 120 should be rotated 90 degrees. Then align the rib 196' inside of the first connection portion 188a with the slot 166 formed on the free-stop hinge device 163 and insert into the first connection portion 188a. At this stage, the free-stop hinge device 163 should be secured inside of the first connection portion 188a. After insertion of the free-stop hinge device 163, the first housing cover 125a is rotated back to 180 degrees.

Referring to FIG. 5J, the spur gear 181 may then be coupled to the slider 151 at the bottom surface portion 186 of the slider 151 to engage with the shaft gear 60 and the sector gear 184 in the gear housing 190. In some implementations, the spur gear 181 can be inserted into the opening 194 formed in the bottom surface portion 186 of the slider 151, and fastened to the screw boss 192 formed in the opening 194 with fastener 244, such as, a screw, for example.

Next, tightly secure the bottom surface portion 186 of the slider 151 via fasteners. Referring to FIG. 5K, the gear housing cover 196 may cover the bottom surface portion 186 of the slider 151. In some implementations, the gear housing cover 196 may be affixed to the bottom surface portion 186 of the slider 151 with fastener 246.

Finally, the second housing cover 115b of the first housing 110 and the second housing cover 125b of the second housing 120 can be installed to the first housing cover 115a and the first housing cover 125a, respectively. In some implementations, the first housing cover 115a of the first housing 110 may be coupled to the second housing cover 115b of the first housing 110 using fasteners 173. The first housing cover 125a of the second housing 120 may be coupled to the second housing cover 125b of the second housing 120 using fasteners 173'. In some implementations, the first housing cover 115a may include screw bosses 197 formed on an inner surface of the first housing cover 115a. The screw boss 197 may be aligned with holes 198 formed on the second housing cover 115b of the first housing 110. In some implementations, the first housing cover 125a may include holes 212 that may align with holes 214 of the second housing cover 125b. In some implementations, the first housing cover 125a may include screw bosses 198 formed on an inner surface of the first housing cover 125a. The screw boss 198 may be aligned with holes 212 formed on the second housing cover 125b of the second housing 120. In some implementations, the fasteners 173' of the second housing 120 can be shorter than the fasteners 173 of the first housing 110 due to the screw bosses 198 in the first housing cover 125a being longer than the screw bosses 197 in the first housing cover 115a.

Figure 6:
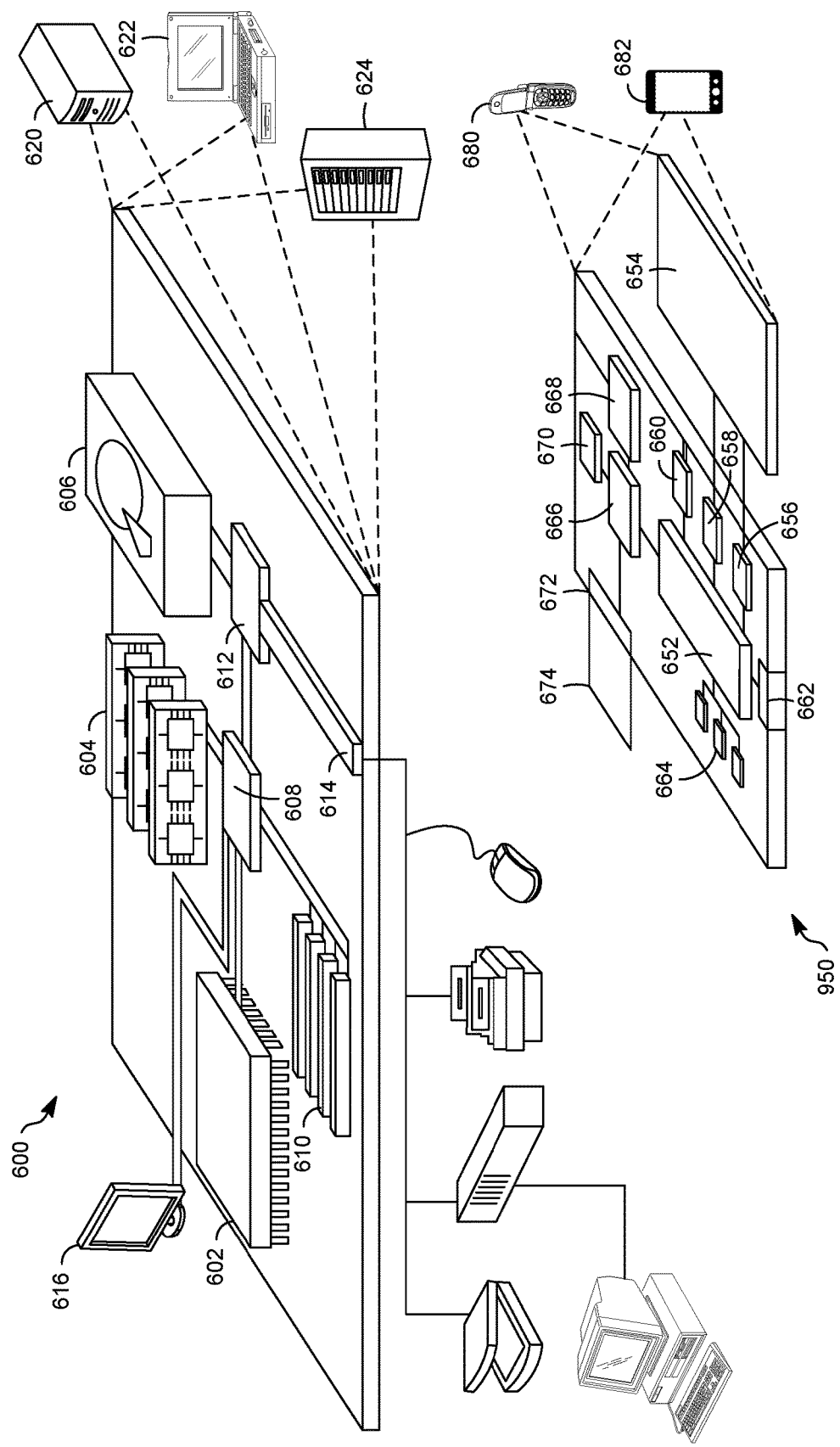
FIG. 6 illustrates an example of an electronic device that can be used with circuits described here.

FIG. 6 shows an example of a generic computer device 600, which may be used with the techniques described here. Features described with respect to the computer device 600 may be included in the electronic device 10 described above. Computing device 600 is intended to represent various forms of digital computers, such as, laptops, workstations, personal digital assistants, servers, blade servers, mainframes, and other appropriate computers. Electronic device 650 is intended to represent various forms of mobile devices, such as personal digital assistants, cellular telephones, smart phones, and other similar electronic devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the electronic device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the electronic device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from electronic device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the electronic device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the electronic device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

The computing device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

In some implementations, the array of display pixels may be formed from liquid crystal display (LCD) components, an array of electrophoretic display pixels, an array of plasma display pixels, microelectromechanical (MEMS) shutter pixels, electro-wetting pixels, micro-light-emitting diodes (small crystalline semiconductor die), quantum dot light-emitting diodes, or display pixels based on other display technologies.

In some implementations, a display pixel may include a light-emitting element (not shown), for instance, an organic light-emitting diode (OLED), and pixel circuit. Each display pixel in the display area may be associated with a pixel circuit, which may include at least one switching thin-film transistor (TFT) and at least one driving TFT on the display. Further, each pixel circuit may be electrically connected to a gate line and a data line to communicate with one or more driving circuits, such as a gate driver and a data driver positioned in the non-display area of the display. For example, one or more driving circuits can be implemented with TFTs in the non-display area. There may be any suitable number of rows and columns of pixels in the display (e.g., tens or more, hundreds or more, or thousands or more).

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein may be interpreted accordingly.

Example embodiments of the present inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the present inventive concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, all terms (including technical and scientific terms) used herein have the same meaning as commonly understood by one of ordinary skill in the art to which this present inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A foldable electronic device, comprising:
   a processor;
   a memory;
   a first housing having a first end portion and a second end portion;
   a second housing having a first end portion and a second end portion;
   a flexible display coupled to the first housing and the second housing; and
   a hinge assembly coupled to the first housing and the second housing and configured to provide for relative rotation of the first housing with respect to the second housing, wherein the first end portion of the first housing is distal to the hinge assembly and the second end portion of the first housing is proximate to the hinge assembly, wherein the first end portion of the second housing is proximate to the hinge assembly and the second end portion of the second housing is distal to the hinge assembly, the hinge assembly including:
      a lever coupled to the first housing;
      a set of gears coupled to the second housing; and
      a linkage member that couples the lever and the set of gears together, wherein:
      upon the relative rotation of the second housing occurring with respect to the first housing in a first direction, the set of gears is caused to rotate, which causes the linkage member to move translationally away from the second housing, which causes the lever to translationally move the first housing in a first linear direction away from the second housing and to cause a distance between the second end portion of the first housing and the first end portion of the second housing to increase, and
      upon the relative rotation of the second housing occurring with respect to the first housing in a second direction opposite to the first direction, the set of gears is caused to rotate, which causes the linkage member to move translationally toward the second housing, which causes the lever to translationally move the first housing in a second linear direction toward the second housing and to cause a distance between the second end portion of the first housing and the first end portion of the second housing to decrease, the second linear direction being opposite to the first linear direction.

2. The electronic device of claim 1, wherein the first housing includes a first length extending between the first end portion and the second end portion of the first housing and the second housing includes a second length extending between the first end portion and the second end portion of the second housing, the second length being longer than the first length.

3. The electronic device of claim 1, wherein the hinge assembly is configured to rotate the second housing towards the first housing.

4. The electronic device of claim 1, wherein the linkage member has a first arm, a second arm, and a connection arm connecting the first arm and the second arm, each of the first arm and the second arm has a first end portion and a second end portion, the first end portion being connected to the lever and the second end portion being connected to the set of gears.

5. The electronic device of claim 4, wherein the linkage member is substantially H-shaped.

6. The electronic device of claim 4, wherein the first end portion of the linkage member includes a hole to interlock with a connection pin disposed on the lever.

7. The electronic device of claim 4, wherein the second end portion of the linkage member includes a protrusion to interlock with a hole disposed on one of the set of gears.

8. The electronic device of claim 1, wherein the hinge assembly further includes a slider, the slider including a shifting member extending from a side portion of the slider and being coupled to the lever.

9. The electronic device of claim 8, wherein one end portion of the shifting member includes a hole to interlock with a connection pin disposed on the lever.

10. The electronic device of claim 8, wherein the lever includes a first end portion and a second end portion, the first end portion being connected to the shifting member and the second end portion being connected to a surface of the first housing.

11. The electronic device of claim 8, further comprising a free-stop hinge in the second housing, the free-stop hinge being connected to a portion of the slider.

12. The electronic device of claim 8, wherein the slider further includes an extension member, the extension member being configured to extend into a groove formed in the first housing and move based on a rotational movement of the second housing.

13. The electronic device of claim 12, wherein the slider includes a first side portion and a second side portion, the extension member extending in an orthogonal direction with respect to one of the first side portion or the second side portion.

14. The electronic device of claim 13, further comprising a gear housing to house at least one of the set of gears, the gear housing being disposed on the first side portion or a second side portion of the slider.

15. A foldable electronic device, comprising:
   a processor;
   a memory;
   a first housing cover and a second housing cover coupled together to define a first housing, the first housing having a first end portion and a second end portion;
   a third housing cover and a fourth housing cover coupled together to define a second housing, the second housing having a first end portion and a second end portion;
   a flexible display coupled to the first housing and the second housing; and
   a hinge assembly coupled to the first housing and the second housing and configured to provide for relative rotation of the first housing with respect to the second housing, wherein the first end portion of the first housing is distal to the hinge assembly and the second end portion of the first housing is proximate to the hinge assembly, wherein the first end portion of the second housing is proximate to the hinge assembly and the second end portion of the second housing is distal to the hinge assembly, the hinge assembly including:
      a lever coupled to the first housing cover of the first housing;
      a set of gears coupled to the third housing cover of the second housing; and
      a linkage member that couples the lever and the set of gears together, wherein:
      in a first position of the electronic device, when the second housing rotates with respect to the first housing in a first direction, the set of gears is caused to rotate, which causes the linkage member to move translationally away from the second housing, which causes the lever to translationally move the first housing in a first linear direction away from the second housing and to cause a distance between the second end portion of the first housing and the first end portion of the second housing to increase; and in a second position of the electronic device, when the second housing rotates with respect to the first housing in a second direction opposite to the first direction, the set of gears is caused to rotate, which causes the linkage member to move translationally toward the second housing, which causes the lever to translationally move the first housing in a second linear direction toward the second housing and to cause a distance between the second end portion of the first housing and the first end portion of the second housing to decrease, the second linear direction being opposite to the first linear direction.

16. The electronic device of claim 15, wherein the first position corresponds to the electronic device being in an open position.

17. The electronic device of claim 15, wherein the second position corresponds to the electronic device being in a folded position.

18. The electronic device of claim 15, wherein the set of gears include a sector gear, a spur gear and a shaft gear, wherein the spur gear meshes with the sector gear and the shaft gear.

19. The electronic of claim 18, wherein the shaft gear is vertically positioned in relation to the spur gear to provide a rotational movement of the second housing, and the sector gear is horizontally positioned in relation to the spur gear to provide a translational movement of the first housing.

20. The electronic of claim 18, further comprising a gear housing disposed on at least one of a first side portion or a second side portion of a slider, the gear housing houses the shaft gear and the spur gear.

* * * * *

UNITED STATES PATENT AND TRADEMARK OFFICE
CERTIFICATE OF CORRECTION

PATENT NO. : 10,901,457 B2
APPLICATION NO. : 16/160768
DATED : January 26, 2021
INVENTOR(S) : Ou et al.

Page 1 of 1

It is certified that error appears in the above-identified patent and that said Letters Patent is hereby corrected as shown below:

In the Claims

In Column 22, Claim 19, Line 9, delete "of" and insert -- device of --, therefor.

In Column 22, Claim 20, Line 14, delete "of" and insert -- device of --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*